Sept. 16, 1924.   B. BOYKIN, JR   1,508,590
GRIPPING DEVICE FOR ROTARIES
Filed June 5, 1922
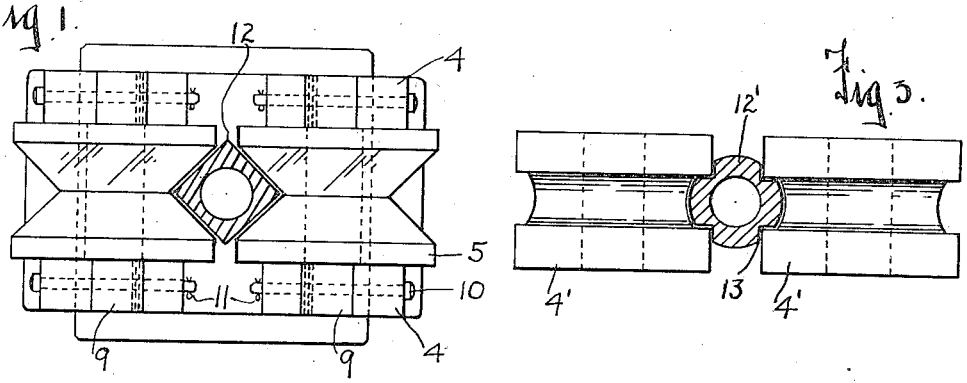
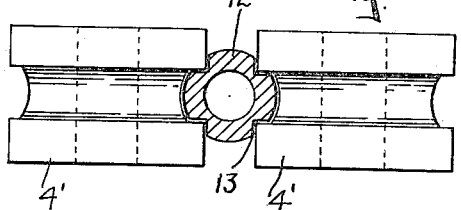
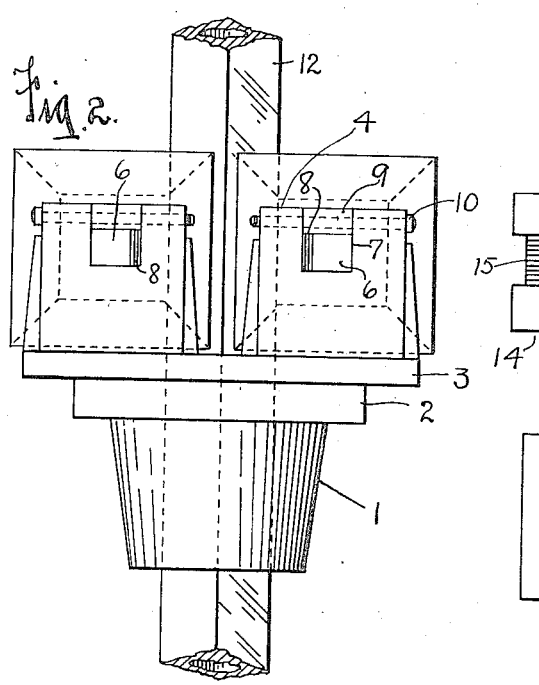
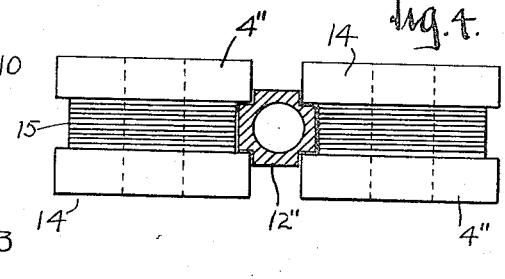
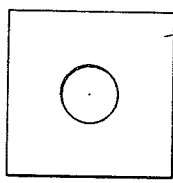
B. BOYKIN, JR.   Inventor
By   Jesse R. Stone
his Attorney Patented Sept. 16, 1924.

1,508,590

UNITED STATES PATENT OFFICE.

BURWELL BOYKIN, JR., OF BEAUMONT, TEXAS.

GRIPPING DEVICE FOR ROTARIES.

Application filed June 5, 1922. Serial No. 566,155.

*To all whom it may concern:*

Be it known that I, BURWELL BOYKIN, Jr., a citizen of the United States, residing at Beaumont, Jefferson County, Texas, have invented a certain new and useful Improvement in Gripping Devices for Rotaries, of which the following is a full, clear, and exact description, such as will enable others skilled in the art to which it appertains to make and use the same.

My invention relates to a means for gripping the drive stem in rotary drilling operations.

It is common in drilling deep wells for oil, gas, sulfur and the like, to employ the rotary system of drilling, wherein the drill stem or pipe is rotated by means of a rotary table through which the drill stem projects. The upper end of the drill stem is usually made up of a special length of heavy pipe with flattened or grooved sides whereby a gripping device upon the rotary table may better hold the same in rotating. This section of pipe is variously called the drive stem, "grief stem" or "kelly joint." There are various gripping devices employed to hold this drive stem against rotation relative to the rotary table so that the rotation of the table will rotate said drive stem. Most of them have rollers arranged to fit about the drive stem and hold it firmly for operation but allowing the rolling of the pipe on the said rollers. An improved example of this type of gripping device is shown in my co-pending application Serial No. 561,178, filed May 15th, 1922, patented March 27, 1923, Numbered 1,449,647, of which this invention is an improvement. The objection to the roller gripping device is that the rollers have but a short line of contact with the drive stem and hence are liable to wear rapidly. It will be seen that the drive stem is tangent to the roller and the point where the driving grip occurs is somewhat unstable, thus allowing excessive vibration of the parts.

It is an object of this invention to obtain a "roller" wherein the surface of contact with the drive stem will be elongated so as to more firmly seize the pipe and prevent wear in use.

Another object is to provide a gripping device which may be detachably connected to rotaries and wherein a plurality of gripping surfaces are provided, one of which may be substituted for another where wear occurs.

Another object is to provide means for adjusting the gripping device so as to provide for maintaining an efficient gripping contact with the pipe at all times.

Further objects and advantages will be apparent from the more detailed description which follows:

Referring to the drawing, Fig. 1 is a top plan view of my improved gripping device; Fig. 2 is a side elevation thereof; Figs. 3 and 4 are top plan views illustrating a different embodiment of the gripping block; and Fig. 5 is a side elevation of one of the plates or washers employed with the embodiment shown in Fig. 4. Like numerals are applied to like parts throughout the several views.

It will be noted that the mounting for the gripping blocks shown in the drawing is not materially different from the mounting disclosed in my co-pending application No. 561,178 previously referred to. There is a lower tapered bushing 1 adapted to fit within a tapered seat in the rotary table. At the upper end of this tapered portion is a squared head 2 adapted to fit within a squared recess in the said rotary table. Above the head 2 is an oblong plate 3 fitting over the upper surface of the rotary table and serving as a base or mounting for the gripping blocks.

The bushing 1 and head 2 and the plate 3, are all provided with a central opening therethru which is circular and somewhat larger than is the pipe or drill stem which is adapted to pass therethrough. At each end of the plate 3 are opposite pairs of supporting posts 4. These supports, as shown in Figs. 1 and 2, are spaced apart a sufficient distance to receive between them a gripping block 5. This gripping block is mounted upon a central shaft 6 which may be cylindrical intermediate its ends, to provide a bearing for the block 5. Its ends, however, are squared as shown in Fig. 2 to fit within slots 7 in each of the posts 4. These slots are wider than is the squared end of the shaft 6 so that a series of adjusting plates or washers 8 may be fitted at one side thereof, and a locking block 9 may be placed above the shaft to hold the same firmly in position. This block is itself locked in place by means of a cross pin 10 passing through the sides of the support 4 and through the locking block 9, and held there by means of cotter pins 11.

The gripping blocks 5 are preferably square when viewed transversely as shown in Fig. 2. The gripping periphery of the block is shaped to fit against the drive stem 12. When the drive stem is square as shown in Figs. 1 and 2 the block is preferably formed with V-shaped grooves in each of the four sides thereof. Thus when the clamping blocks are adjusted toward each other so as to fit about the pipe as shown in Fig. 1 there will be a bearing contact with the drive stem which will extend nearly the full width of the clamping blocks. The blocks will therefore be better adapted to rotate the drive stem than will be the case where the roller is round as previously described. When wear occurs on the blocks the shafts 6 may be adjusted so as to throw the clamping blocks 5 toward the drive stem by shifting some of the plates or washers 8 from the inner side of the shaft 6 to the opposite side. Further, when it is found that the wear has become excessive, the clamping blocks 5 may be rotated through 90 degrees so as to present another clamping face to the drive stem. This rotation may be accomplished be removing the locking pin 10 and the block 9 and raising the shaft 6 upwardly out of the slot until enough space is provided to rotate the clamping block 5 upon the shaft. When the new face is presented to the drive stem, the shaft may be lowered again into its bearing and locked into position as described above. This may be repeated when necessary until the four sides of the block have become worn and thus make it necessary to provide a new gripping block.

In Fig. 3 I have illustrated a different shaped gripping surface upon the block. This different shape is used to accommodate the clamping of the device to a drive stem 12′ of different shape. The pipe is fluted or grooved longitudinally at 13 to receive the sides of the gripping block 4′ as shown. These blocks are square when viewed from the side and are mounted in the same manner as are the blocks shown in Figs. 1 and 2.

In Fig. 4 I have shown gripping blocks 4″ somewhat similar to those shown in Fig. 1 but adapted to fit about a pipe which is cross-shaped in transverse section. In this modification however, I have made the blocks 4″ further adjustable by the use, between the two end blocks 14, of a series of intermediate thinner plates of smaller dimension, 15. This block may be adjusted to take up wear by removing one of the plates 15 when necessary so as to bring the side plates 14 closer together. It is also possible to rotate these blocks upon their shaft in the same manner as described in connection with the modification shown in Figs. 1 and 2. Furthermore, each of the side blocks 14 may be removed from the shaft and reversed with the outer face inwardly when desired, so as to present a new gripping surface to the drive stem 12″. When the plates or washers 15 are removed from between the side blocks 14 they may be placed upon the shaft outside of the blocks 14 so as to hold the said blocks inwardly against the pipe in an obvious manner.

The advantages of this type of gripping device will be obvious to one skilled in the art. The drive stem will be held more firmly in the rotary so that it will be more efficiently operated, and, because of the wide surface of contact presented against the drive stem, the wear will not be excessive. Furthermore the surfaces, when once worn, may be moved out of contact with the pipe and a new driving surface used to grip the drive stem. The gripping blocks will be spaced from the pipe a sufficient distance to allow a free vertical sliding movement of the pipe relative to the jaws, as is usual with this type of gripping means. The use of the squared blocks will also hold the drive stem more firmly because the blocks will rest upon the plate 3 of the supporting bushing and thereby prevent the usual amount of vibration which occurs with the ordinary rollers now employed in gripping the pipe.

Having thus described my invention, what I claim is new and desire to protect by Letters Patent is:

1. A gripping device for rotary drive stems comprising a supporting base, two parallel shafts mounted in spaced relation on said base, and gripping blocks mounted on said shafts, each of said blocks having a polygonal periphery, one side of which contacts with said base the sides thereof being grooved to fit a drive stem.

2. A gripping device for rotary drive stems comprising a supporting base, bearing shafts supported in spaced relation thereon, a clamping block on each of said shafts, said blocks being polygonal and grooved peripherally to clamp the drive stem, one side of each of said blocks contacting with the base to prevent relative movement of said blocks during use.

3. A gripping device for rotary drive stems comprising a supporting base, opposite pairs of bearing posts on said base, shafts mounted in each said pair of posts, a drive stem gripping device on each said shaft comprising squared blocks, having polygonal grooves formed in each peripheral face thereof to fit the said drive stem, one of the faces of each said block adapted to contact with the said base to prevent rotation thereof in use.

In testimony whereof, I hereunto affix my signature this the 1st day of June, 1922.

BURWELL BOYKIN, Jr.